April 15, 1952     C. H. O. LÜBECK     2,592,921
ALKALINE ACCUMULATOR WITH SO-CALLED
DOUBLE OR TWIN CELLS
Filed June 20, 1950
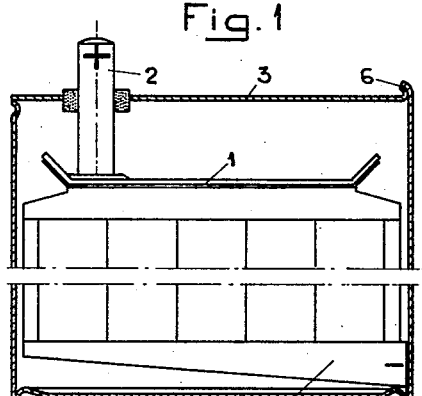
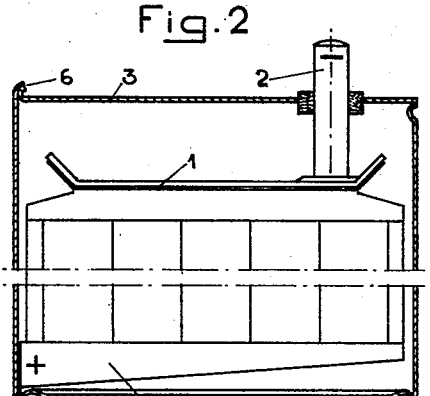
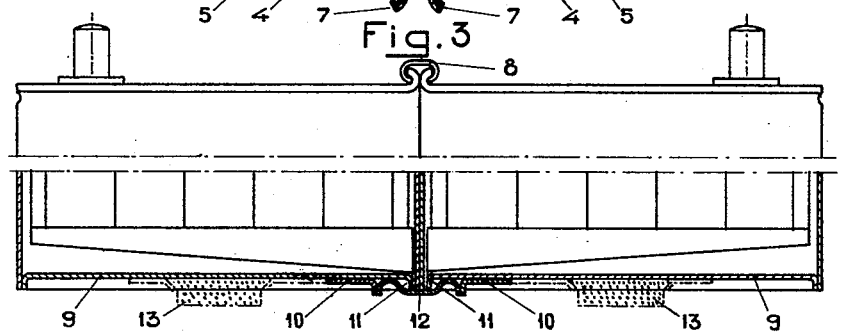
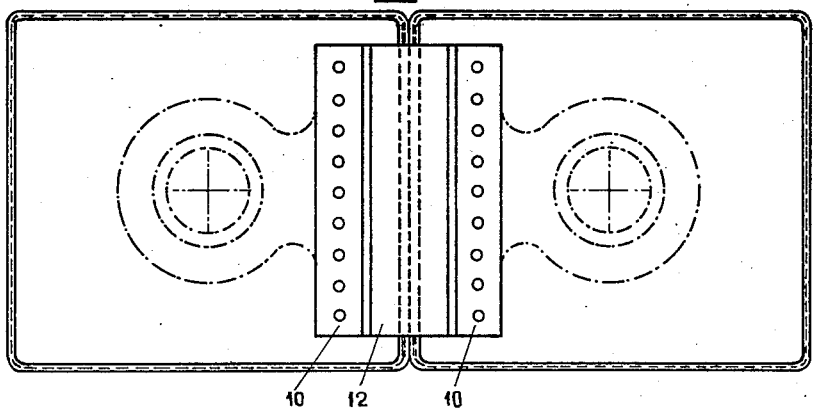
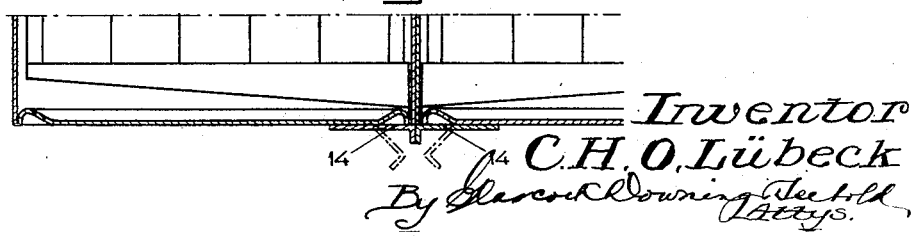
Inventor
C. H. O. Lübeck Patented Apr. 15, 1952

2,592,921

UNITED STATES PATENT OFFICE 2,592,921

ALKALINE ACCUMULATOR WITH SO-CALLED DOUBLE OR TWIN CELLS

Carl Hilding Ossian Lübeck, Stockholm, Sweden

Application June 20, 1950, Serial No. 169,137
In Sweden June 27, 1949

4 Claims. (Cl. 136—7)

The present invention refers to electric accumulators, preferably alkaline accumulators with metallic cell vessels, and particularly relates to a form of embodiment of such accumulators which is generally called a double- or twin-cell, that is to say an accumulator cell composed of two elements or cell halves, the electrolyte of each element being separated from each other, the electrodes of one polarity of the one cell half and the electrodes of the opposite polarity of the other cell half being metallically connected with the respective metallically connected cell vessels or cell halves.

It has been suggested previously to make the double cells in consideration either with the electrodes built into separate cell vessels and to combine two such vessels by welding the opposite borders of them for instance at the top and at the bottom so as to form a cell unit, wherein each cell vessel constitutes one half of the double cell, or to make the vessel of the double cell, for instance according to the Swedish Patent No. 36,806 and the Swedish Patent No. 68,750, with a common partition, so that the two cell halves are metallically connected with each other already from the beginning. The connection of the electrodes of the one polarity in the one cell half and the electrodes of the other polarity in the other cell half to the common cell vessel in the latter type of double cells would preferably be undertaken at the bottom of the cell vessel adjacent to the common wall to the vessel, as shown in Fig. 1 of the Swedish Patent No. 116,588, for example.

Although from a technical point of view entirely satisfactory accumulator constructions are obtainable with the above-mentioned arrangements of double cells, these arrangements nevertheless must in certain cases be considered as suffering from some practical drawbacks for the reason that the two cell halves cannot be separated without becoming damaged, so that they, to the one or the other of them, cannot be used again to advantage. In the manufacture for example, a short-circuit may have occurred in the one cell half of a nature to necessitate rejection of this cell half, and in that case it is obviously a disadvantage to have to reject also the other faultless half or the whole double cell. In the manufacture of accumulators, difficulties are also met with in providing for so uniform a product that all of the cells will have exactly the same capacity. Differences appear, however, and may manifest themselves only after the formation of the respective cells, and it may thus happen that the two cell halves show somewhat different capacities, the lowest capacity then defining the capacity of the whole double cell. Even if the difference in capacity between the two cell halves would be small from the beginning, it may happen in using the battery during an extended period, and particularly under operating conditions where the capacity of the battery will always have to be utilized to its utmost, in other words, where the whole capacity of the battery is utilized in every discharging period, that a cell half having from the beginning a capacity somewhat lower than that of the others will at the termination of every discharging period be subjected to so-called back charging, whereby the injury or the impairment in capacity is increased by degrees in the cell half which from the beginning was lagging behind in capacity.

The drawbacks touched upon above may make it desirable, particularly where large cells are brought into consideration, to provide for facilities of separating the two halves of a double cell, without the cell halves having to be damaged. With such facilities it would be possible readily to replace a damaged cell half and, in manufacture on a large scale, from the beginning to select and combine cell halves of the same capacity, it becoming thus also possible to obtain batteries comprising cells with an extraordinarily uniform capacity mutually.

This desideratum is the subject of the present invention, which will be described more closely with reference to the accompanying drawing. In this drawing, each of the Figures 1 and 2 diagrammatically illustrates a vertical section of the upper and the lower part of a cell half according to the invention, said cell halves being intended to be combined into a double cell. The upper part of Fig. 3 shows the upper part of two connected cell halves in elevation, and the lower portion of the same figure represents another embodiment of the connection in vertical section, this latter connection being shown in a plan view from below in Fig. 4. Fig. 5 is a vertical section of a modification of the connection of the lower portions of two cell halves.

As will appear from Figs. 1 and 2, each cell half is made as a separate cell, in which the electrodes of the one polarity, such as the positive electrodes of the one cell half, and the negative electrodes of the other cell half, are connected together in the cell at the top by a common pole bridge or bus bar 1 in each cell half, said bridge or bar being provided with one or more pole bolts 2 extended through the cover 3 of the cell and forming the positive pole of the one and the negative pole of the other cell half, while the electrodes of the other polarity, i. e. the negative electrodes of the former and the positive electrodes of the latter cell half, with their contact lugs 4 turned downwardly, are in a manner known per se welded onto and along the lower border of either cell vessel wall or, perhaps, to two opposed borders of the cell vessel, preferably simultaneously with the welding of the bottom 5 of the cell vessel.

As shown in Figs. 1 and 2, the vessel of each cell half is made so that one of the borders of one of the sides of the shell of the cell vessel, that is to say of one of the four vertical sides, projects at the top and at the bottom somewhat beyond the other borders, which projecting borders or flanges 6 and 7 are bent somewhat inwardly, that is to say toward the vessel, the cover 3 and the bottom 5 being preferably also provided with a corresponding flange intended to be welded at the top and at the bottom to the projecting border of the shell.

When the two cell halves are then combined with said sides facing each other, as shown at the top in Fig. 3, the opposite flanges of both cell halves will form together an upper and a lower attachment for gripping bars 8 adapted to be thrust over the respective flanges at the top and at the bottom to embrace these flanges so as to keep the two cell halves properly coupled.

In the last-mentioned arrangement, the electrical connection between the vessels of the two cell halves, and thus also between the electrodes of the one polarity in one cell half and the electrodes of the other polarity in the other cell half, will be obtained through the upper and lower bars 8 as well as through the contact of the opposite walls of the cell vessels.

Such a connection should be sufficient, provided that the metal surfaces can always be maintained clean and free from oxide, but since one can never rely on this with any degree of safety, the invention has for its object to provide an electrical connection according to a modified embodiment shown below in Figs. 3 and 4, which connection offers entire safety in said respect under all circumstances. In this case, the two cell halves are to be made in the manner above described, save for the fact that, as shown in Figs. 3 and 4, a sheet-metal strip or bar 10 is welded, for instance by electrical point or seam welding, onto each bottom plate 9, before these plates are welded into the respective cell halves, said strip or bar having a curved or projecting edge, which should be located at so great a distance from the flange 11 of the bottom that it will not prevent the welding-in of the bottom. In this case, the bottom flange 11 may preferably be made straight and lower than, for instance, the flange 7 in Figs. 1 and 2, and in agreement with the other borders of the bottoms. Then, when two cell halves are to be coupled, and are placed for this purpose with their sides facing each other, a connecting bar 12 is made use of, which is provided with two curved edges corresponding each to one of the projecting edges on the sheet-metal bars 10, to which they are to be welded. In this way a welded metallic through-connection is obtained between the respective electrode structures of the two cell halves, in contradistinction to the arrangement shown at the top in Fig. 3, where only a bearing contact is obtained between the cell vessels. There is of course nothing to prevent the use of the arrangement shown below in Fig. 3 also at the top of the cell vessels, that is to say, in order also to unite the covers of the two cell halves in this way, but on the other hand this is hardly believed to be necessary, and for this reason the arrangement shown at the top in Fig. 3 is given the preference at the top of the cells. If it is desired to separate the two halves of a double cell coupled in this way, it is only required to grind down the two welding joints on the connecting bar 12 to an extent permitting loosening of the latter, which can be readily undertaken without inflicting any injury to the respective cell halves, and either one of the latter may then be coupled to another cell half in the manner above described. If required, the same procedure might be repeated many times, particularly if the projecting edges in consideration are made somewhat higher than shown below in Fig. 3.

The sheet-metal bars 10 shown in Figs. 3 and 4 may suitably be shaped so as to serve at the same time as an attachment for bottom supports 13 of insulating material, as shown by chain-dotted lines in the latter figures.

Obviously, the invention may be further modified in its embodiments, without the inventive idea being departed from. For example, Fig. 5 shows an embodiment of the sheet-metal bars 14 corresponding to the bars 10 in Figs. 3 and 4, the construction according to Fig. 5 having for its object to make the projecting edges or flanges of the respective bars meet in the coupling in the two cell halves, so that welding may be effected without the connecting bar 12 shown in Figs. 3 and 4. In this case it is assumed that the sheet-metal bars 14 are formed from the beginning with upwardly bent flanges, as indicated by chain-dotted lines in Fig. 5, so that the welding of the respective bottoms into the cell halves may take place without impediment, the flanges of the bars 14 being depressed prior to welding. To separate the two cell halves from each other it is then only necessary to grind or file down the welding joint, whereupon either cell half may be replaced and the bars 14 can be welded together without being bent anew.

I claim:

1. In an alkaline twin-cell accumulator battery comprising two separated metallic cell vessels electrically connected and made of plates welded together along their border edges, means for mechanically and electrically connecting the cell vessels in a position in which opposite side walls are held in contact with one another, comprising metal strips arranged longitudinally of adjacent border edges of the contacting side walls, so as to cover said border edges, and welded to the vessels on both sides free of the border edges, said metal strips being provided with outwardly projecting longitudinal flanges arranged to form joints between adjacent strips and welded together, so as to allow the cell vessels to be separated by grinding off the welding joint, without inflicting any damage to the border edges of the cell vessels proper.

2. In an alkaline twin-cell accumulator battery as claimed in claim 1, in which two strips are welded to the vessels each on one side of the adjacent border edges, and connected together by means of an intermediary strip covering the border edges and having outwardly projecting flanges welded to the corresponding flanges of the strips first mentioned.

3. In an alkaline twin-cell accumulator battery as claimed in claim 1, in which the vessels are connected together along the lower edges of the contacting side walls by means of strips arranged and welded together in the manner set forth in said claim, whereas the upper border edges of said side walls are clamped together by means of a longitudinally extending bar embracing said edges.

4. In an alkaline twin-cell accumulator battery as claimed in claim 1, in which two strips are welded to the vessels each on one side of the adjacent border edges at a distance thereof and welded together by means of a single flange joint.

CARL HILDING OSSIAN LÜBECK.

REFERENCES CITED

The following references are of record in the file of this patent:

UNITED STATES PATENTS

| Number | Name | Date |
| --- | --- | --- |
| 425,818 | McLaughlin | Apr. 15, 1890 |
| 709,611 | Silvey | Sept. 23, 1902 |
| 1,150,023 | Ford | Aug. 17, 1915 |
| 1,377,995 | Willard | May 10, 1921 |
| 1,472,391 | Ford | Oct. 30, 1923 |
| 1,880,323 | Lindley | Oct. 4, 1932 |

FOREIGN PATENTS

| Number | Country | Date |
| --- | --- | --- |
| 864,974 | France | Feb. 10, 1941 |